United States Patent [19]

Yamada et al.

[11] 4,385,360

[45] May 24, 1983

[54] COMPUTER-CONTROLLED REPRODUCTION DEVICE

[75] Inventors: Mitsuru Yamada; Paul H. Yamada; Alvin E. Evans, all of Chicago, Ill.

[73] Assignee: Micro-Power Computer Systems, Chicago, Ill.

[21] Appl. No.: 174,825

[22] Filed: Aug. 4, 1980

[51] Int. Cl.³ ............................................. G05B 19/00
[52] U.S. Cl. .................................. 364/514; 364/475; 358/299; 382/1
[58] Field of Search ............... 364/515, 518, 520, 474, 364/475; 358/83, 101, 298, 299; 408/3, 135; 409/80

[56] References Cited

U.S. PATENT DOCUMENTS

| | | | |
|---|---|---|---|
| 2,874,479 | 2/1959 | Farber | 358/299 |
| 2,881,246 | 4/1959 | Fairchild | 358/299 |
| 2,910,910 | 11/1959 | Rosenfeld | 356/2 |
| 3,217,219 | 11/1965 | Muldoon | 318/573 |
| 3,534,396 | 10/1970 | Hart et al. | 364/474 |
| 3,553,358 | 1/1971 | Lauer | 358/93 |
| 3,621,214 | 11/1971 | Romney | 364/522 |
| 3,675,333 | 7/1972 | Wilson | 33/23 C |
| 3,843,875 | 10/1974 | Goodstal et al. | 364/475 |
| 3,857,025 | 12/1974 | English et al. | 364/475 |
| 3,881,098 | 4/1975 | Rich | 364/490 |
| 3,991,652 | 11/1976 | Fini, Jr. | 409/80 |
| 4,013,876 | 3/1977 | Anstin | 358/299 |
| 4,058,849 | 11/1977 | Fitzgerald | 364/520 |
| 4,078,253 | 3/1978 | Kajiura | 364/900 |

Primary Examiner—Gary Chin
Attorney, Agent, or Firm—Fitch, Even, Tabin, Flannery & Welsh

[57] ABSTRACT

A computer-controlled reproduction device is described for recreating a 3-dimensional image representative of a subject image in a permanent medium such as a sheet of transparent plastic. Digital signals representative of the subject image are stored in the memory of the computer and used by the computer to control a machine tool for drilling a plurality of holes in the plastic sheet representative of the subject image. The machine tool contains a drill bit which is tapered over the length of its travel into the plastic sheet so the deeper the penetration into the sheet, the larger the diameter of the entrance hole in the sheet. The depth of each hole is controlled by the computer to correspond to the lightness of the subject image at that point.

15 Claims, 12 Drawing Figures

COMPUTER-CONTROLLED REPRODUCTION DEVICE

The present invention relates to reproduction devices, and, more particularly, a computer-controlled reproduction device for recreating a multi-dimensional image in a permanent medium such as plastic.

In the past video signals from a suitable source such as a video camera have been used to generate a pictorial image on a sheet of paper. The video signals can be processed with a computer to drive a paper printer for recreating a pictorial representation of an image viewed with the video camera.

However, these devices have been limited in that they only recreate a 2-dimensional pictorial representation of an image on a planar surface.

Accordingly, it is an object of the present invention to provide a computer-controlled reproduction device for recreating a multi-dimensional image in a permanent medium such as plastic.

Another object of the present invention is to provide a method of recreating a multi-dimensional image in a permanent medium such as plastic from a subject image.

Another object of the present invention is to provide a computer-controlled reproduction device of the type described which can quickly and accurately recreate a multi-dimensional image in a permanent medium such as plastic.

Other objects of the present invention in addition to those set forth above, will become apparent to those skilled in the art from the following description taken in connection with the accompanying drawings wherein:

Generally the device of the present invention comprises a computer-controlled reproduction device for recreating a 3-dimensional image representation of a subject image in a sheet of transparent plastic. A digital signal representative of the subject image is stored in the memory of the computer and used by the computer to control a machine tool for drilling a plurality of holes in the plastic sheet representative of the subject image. The machine tool contains a drill bit which is tapered over the length of its travel into the plastic so that the deeper the penetration into the sheet, the larger the diameter of the entrance hole in the sheet. The depth of each hole is controlled by the computer to correspond to the lightness of the subject image at that point.

A video signal generated by a video camera is converted to an approximately 60,000 pixel array of digital signals representative of the subject image. The computer samples every fourth pixel and a 6-bit digital signal representative of each of the sampled pixels is stored in a 120×126 array of memory location in computer memory. Each 6-bit digital signal has 64 possible values which is representative of the intensity of the corresponding pixel. The address of each 6-bit digital signal in the array of memory locations is representative of the surface position of the pixel in the subject image.

The digital signal is stored in the memory of the computer and used by the computer to control the machine tool to systematically drill a 120×126 array of holes in the plastic sheet representative of the subject image.

The machine tool comprises a carriage within which the plastic sheet is secured and which moves under the direction of the computer horizontally on the top of a table over the drill bit. The location of each 6 bit digital signal in the memory array and the value of the digital signal which is representative of the intensity of the sampled pixel, corresponds to a point in a 3-dimensional orthogonal coordinate system located on or in the plastic sheet as fixed in the carriage. The x- and y-axes lie along two horizontal adjacent edges of the plastic sheet, and the z- axis is directed upward along the edge of the corner of the plastic sheet, which is also the direction of travel of the drill bit.

The motion of the carriage is powered in two orthogonal directions along the x- and y- axes by two motors. The motors are connected to the carriage by a unique drive mechanism including two drive chains which isolate the weight of the motors from the carriage thereby greatly increasing the speed at which horizontal motion of the plastic sheet can occur. The horizontal motion positions the plastic sheet over the drill bit which itself can only be positioned vertically along the z- axis. Preferably to further increase the speed of the operation the drill bit cuts up into the plastic and is separated from its drive motor by a flexible drive shaft.

The three motors which are used to control the vertical position of the drill and the horizontal positions of the carriage along the x- and y- axes are all stepper motors. These stepper motors each respond to an output of the computer which provides position data, through translators, to the three stepper motors.

Figure 1:
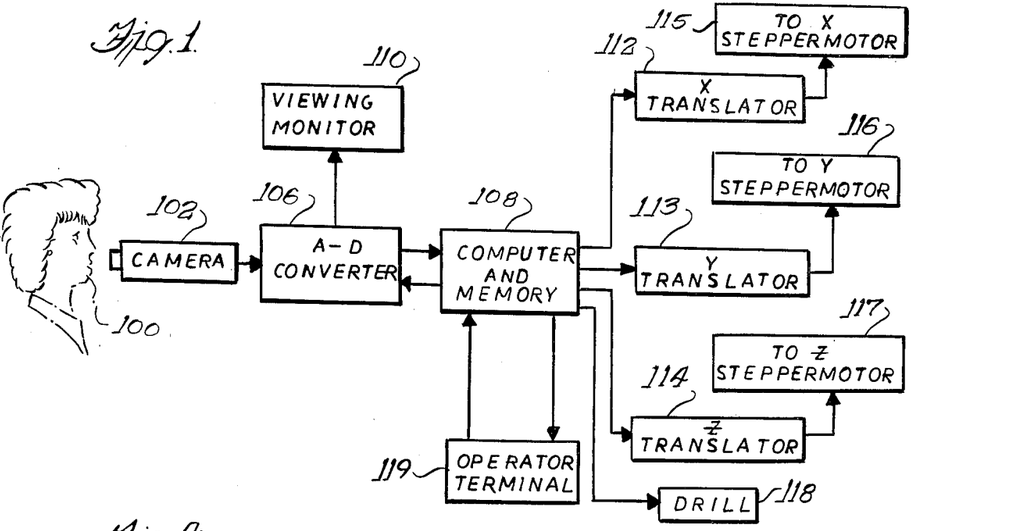
FIG. 1 is a block diagram showing the functional components of the device of the present invention.

Referring more particularly to the drawings, FIG. 1 is a block diagram of the functional components of the device of the present invention. A subject image 100 is viewed by a video camera 102 which inputs its horizontal ("X") and vertical ("Y") sync pulses and video output to an analogue-to-digital converter, hereinafter called A-D converter 106. The present embodiment uses a panasonic Model WV 1000 closed-circuit TV camera. The A-D converter 106 is a DS-68 Digisector board available from a company called Micro Works, which is located in Santa Monica, Calif.

The A-D converter 106 contains counters which keep track of the scanning spot position with respect to discrete X-coordinate points and discrete Y-coordinate points providing an array of about 64,000 "pixels" representing the image seen by the video camera 102. The A-D converter 106 also digitizes the video intensity for each of the pixels as a 6-bit binary number.

The A-D converter 106 is designed to scan the approximately 60,000 pixels and transmit the digitized intensity at each pixel into a computer 108. The computer 108 samples every fourth pixel with the information being stored as a 120×126 array of 6-bit digital signals in a memory portion of the computer 108. The program of the A-D converter 106 is activated and controlled by the computer 108.

The A-D converter 106 also outputs its digitized intensity data to a viewing monitor 110 which provides a visual representation of the data transmitted to the computer 108. The present embodiment uses a 9" panasonic closed circuit TV monitor. The computer 108 is an SWTPC 6800 Computer System with 20K memory, which was manufactured by Southwest Technical Products Corp., San Antonio, Tex.

The computer 108 outputs to three translators: an X-translator 112, a Y-translator 113, and a Z-translator 114, which are respectively connected to X-stepper motor 115, Y-stepper motor 116, and Z-stepper motor 117. The computer 108 also outputs to a drill 118. An operator controls the system from the operator terminal 119 which is connected to the computer 108. The terminal 119 is an SWTP CT-82 with one serial interface and two parallel ports.

The X-translator 112 receives a signal from the computer 108 directing the X-stepper motor 115 to rotate a specified number of angular steps in a specified direction. The X-translator 112 then converts the digital input from the computer 108 into an appropriate pulse sequence to drive the X-stepper motor 115 in accordance with the signal from the computer 108. The Y- and Z-stepper motors 116 and 117 are identically related to the Y- and Z- translators 113 and 114. The embodiment uses stepping motor translators, and slosyn D.C. stepping motors commercially available from the Superior Electric Co., Bristol, Conn., models nos. H550, HS550-1001 and MO63-FD09 for, respectively, the X-, Y-, and Z-stepper motors 115, 116 and 117.

Figure 2:
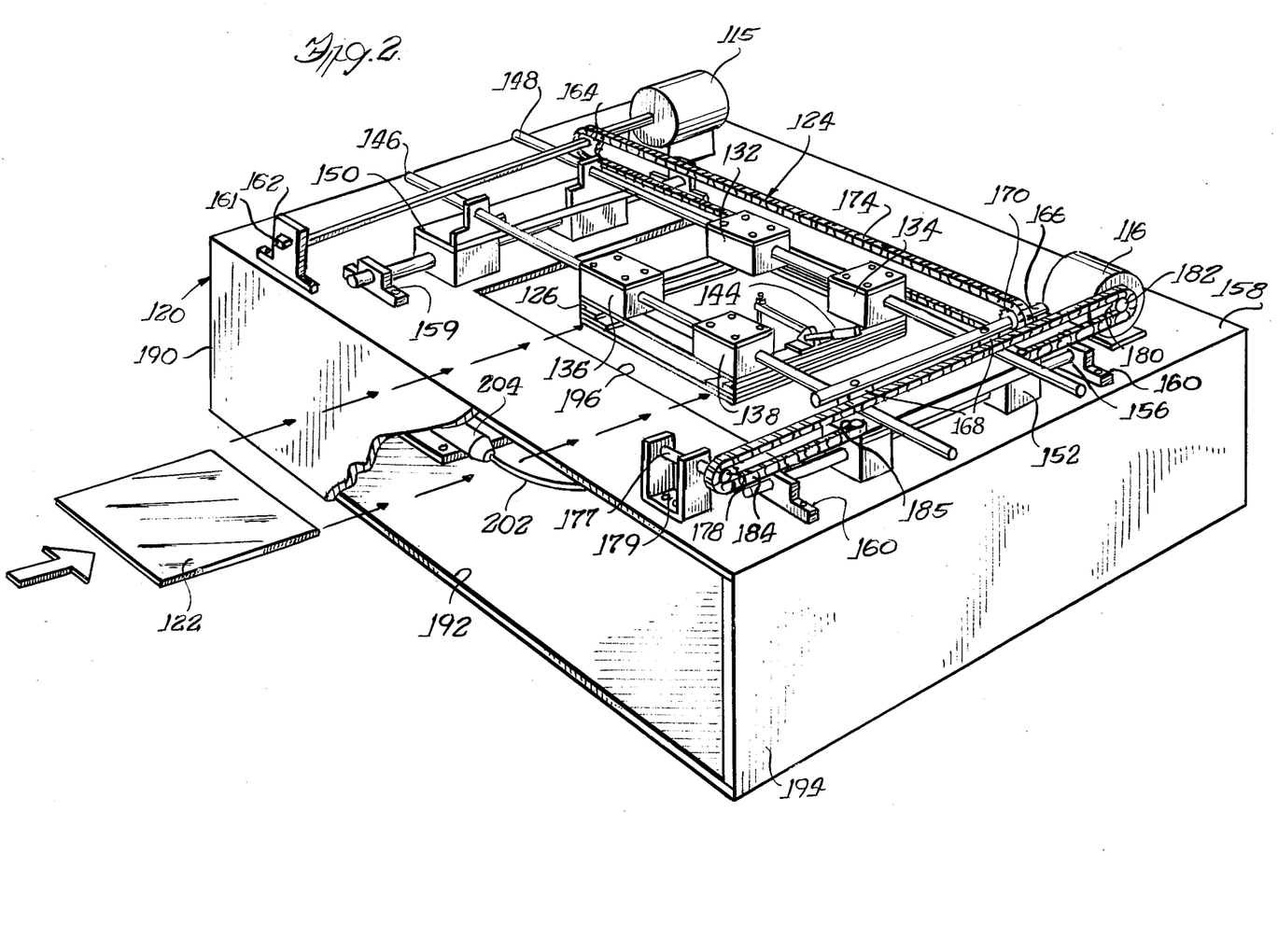
FIG. 2 is a perspective view of a machine tool constructed according to the device of the present invention.
Figure 3:
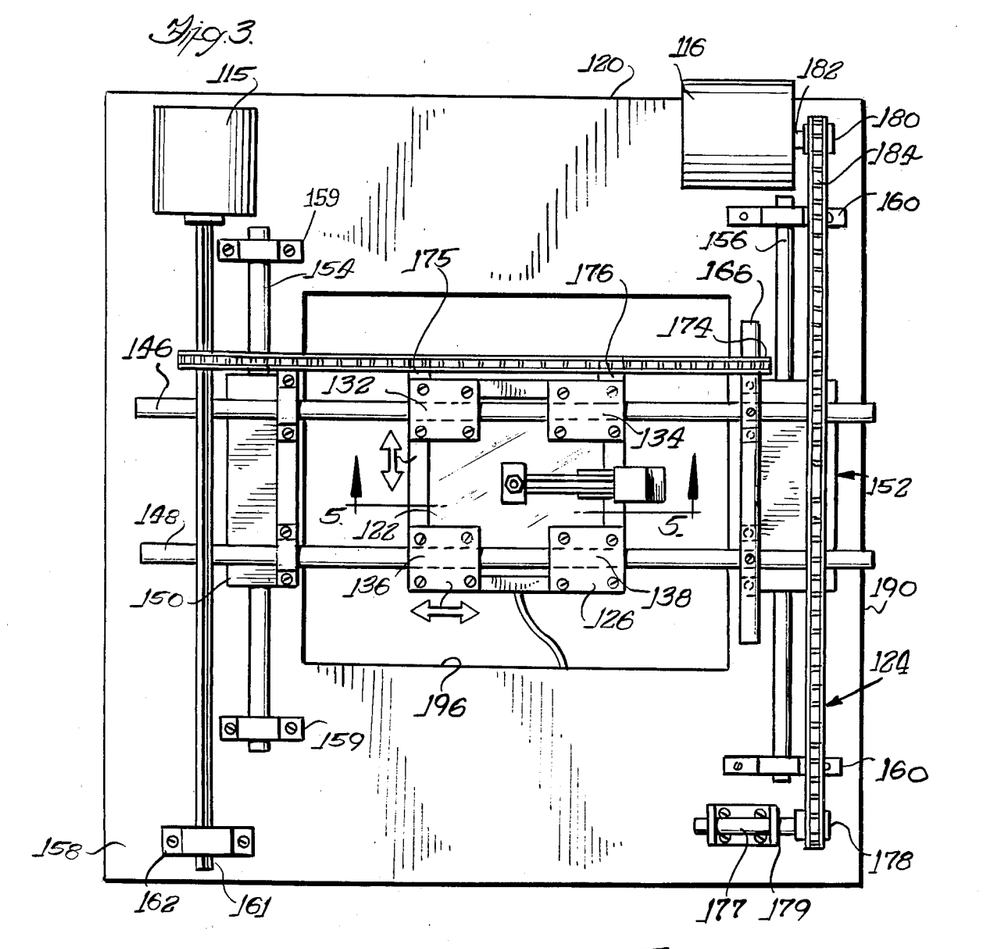
FIG. 3 is a planar view of the machine tool in FIG. 2.
Figure 4:
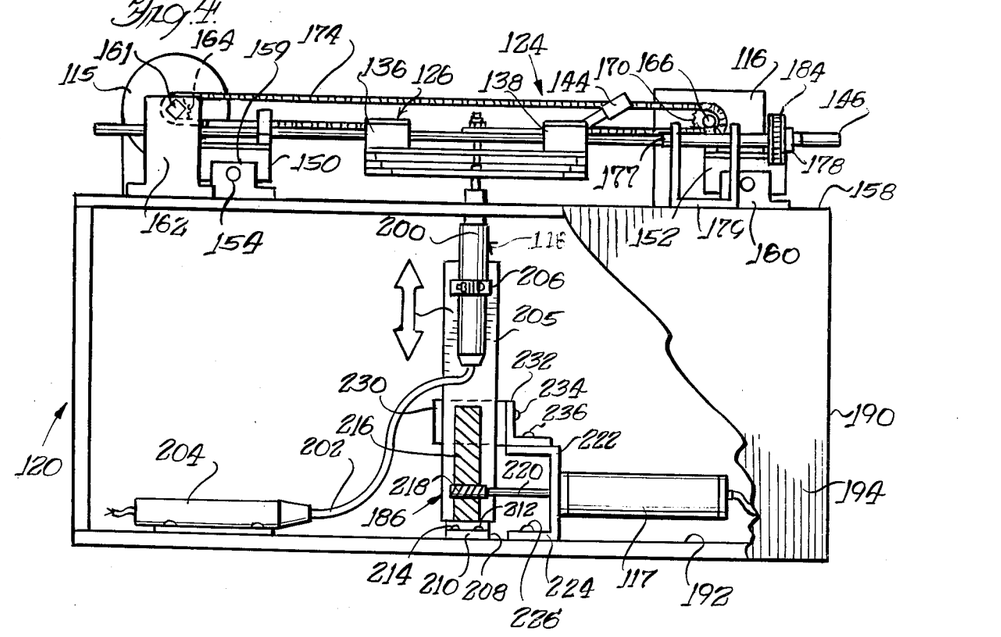
FIG. 4 is a partially broken away side view of the machine tool in FIG. 2.

Referring to FIGS. 2, 3 and 4 a machine tool 120 is shown which is used to drill, under the control of the computer 108, a representation of the subject image 100 into a rectangular shaped opaque plastic sheet 122. The machine tool 120 comprises the X- and Y-stepper motors 115 and 116 which are drivingly engaged to positioning means 124 for positioning a carriage 126 in the x- and y-directions. The plastic sheet 122 is clamped to the carriage 126 so that the horizontal position of the plastic sheet 122 can be systematically controlled by the X- and Y-stepper motors 115 and 116 under the control of the computer 108.

Figure 5:
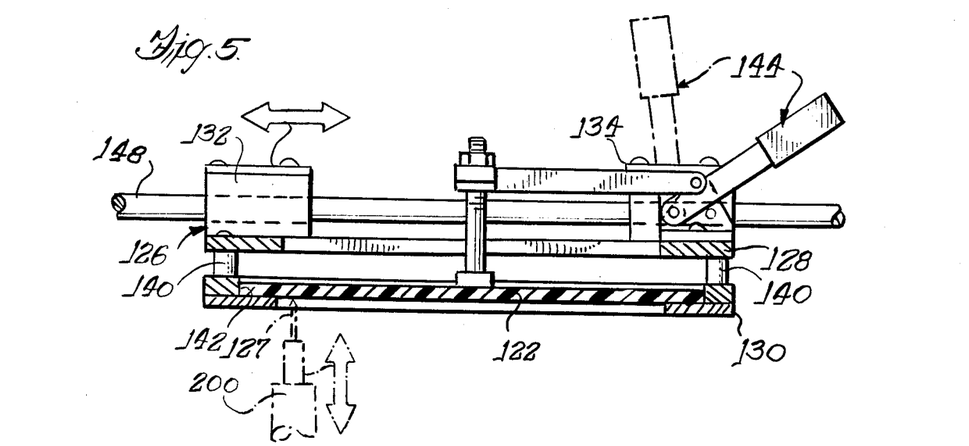
FIG. 5 is a sectional view taken generally along lines 5—5 in FIG. 3 showing a plastic sheet mounted in a carriage of the machine tool.

As can be seen in FIGS. 4 and 5 when clamped into the carriage 126 the plastic sheet 122 is positioned horizontally over a drill bit 127 of the drill 118. The positioning means 124 during operation of the system systematically moves the plastic sheet 122 under the direction of the computer 108 so as to present a 120×126 array of positions on the bottom of the plastic sheet 122 to the drill bit 127. These positions correspond to the 120×126 array stored in the memory portion of the computer 108 which is representative of the surface positioning of the subject image 100.

Figures 6, 7, 8:
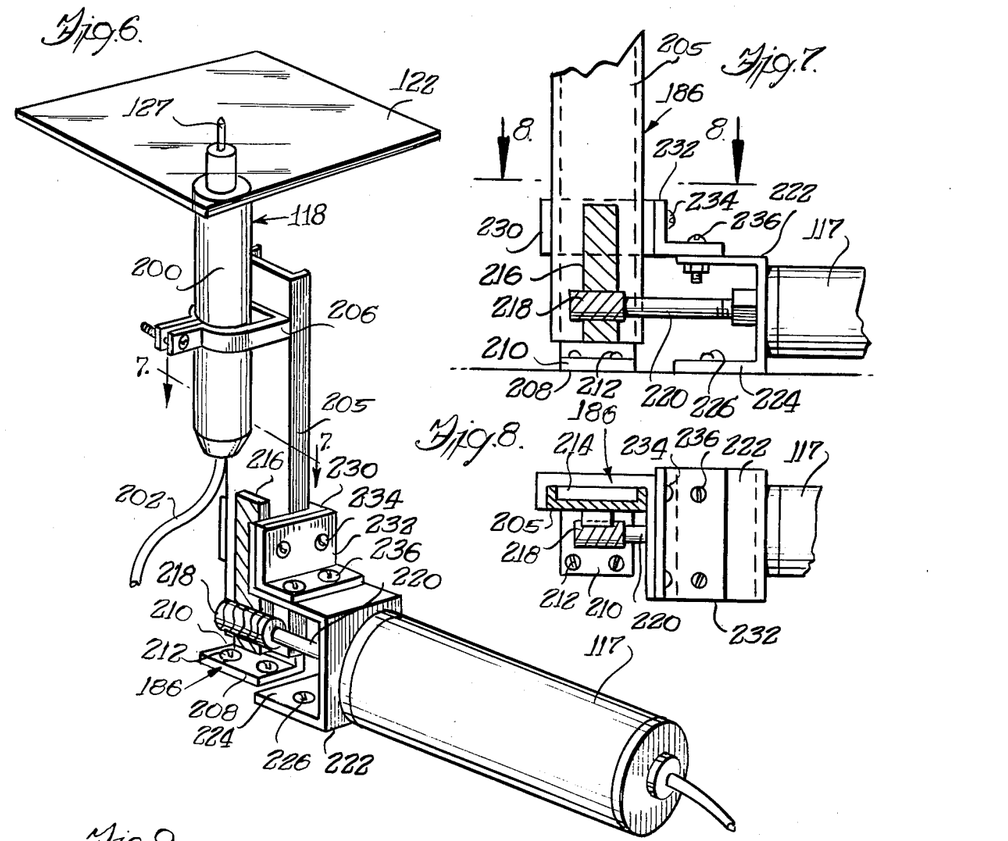
FIG. 6 is a perspective view of drill positioning means of the machine tool.
FIG. 7 is a partial side view taken generally along lines 7—7 in FIG. 6.
FIG. 8 is a sectional view taken generally along lines 8—8 in FIG. 7.
Figure 9:
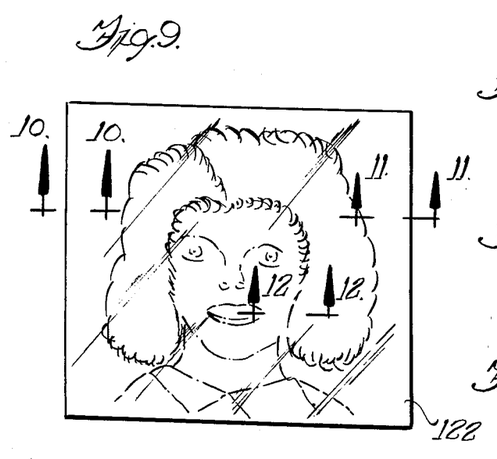
FIG. 9 is a planar view of a plastic sheet with an image drilled into it by the device of the present invention.

Referring to FIGS. 2, 4 and 6 the carriage 126 for holding the plastic sheet 122 comprises two aluminum frames 128 and 130. Four metal blocks 132, 134, 136 and 138 are mounted on the corners of the upper frame 128 and fixed there by screws. The metal block 132 is drilled to provide a ½" diameter hole passing through the block 132 in a direction parallel to the frame 128. Metal blocks 134, 136 and 138 are drilled in the same manner as block 132. The blocks are mounted on the corners of the frame 128 so that the holes in blocks 132 and 134 are aligned with each other, as are the holes in blocks 136 and 138. The holes are dimensioned so that the blocks can slide freely upon ½" diameter steel shafts.

The lower and upper frames 128 and 130 are separated by spacers 140 and held rigidly in position by screws (not shown) passing through the spacers 140. The plastic sheet 122 slides into the carriage as shown in FIG. 2 and is set against one corner which is designated as a reference corner 142. The X- and Y-coordinates of the carriage 126 are determined with respect to the reference corner 142.

The plastic sheet 122 can be secured to the carriage 126 by a clamp 144. The clamp 144 is attached to the outer face of the frame 128 and when engaged securely holds the plastic sheet 122 against the inner face of the frame 130.

Referring to FIGS. 2, 3 and 4 it is shown how the X- and Y-stepper motors 115 and 116 are drivenly engaged by the positioning means 124 to the carriage 126 for systematically controlling the horizontal position of the plastic sheet 122 over the drill bit 127.

The carriage 126 is mounted upon two parallel ½" diameter, 36" long steel bars 146 and 148. The bar 148 is slidably engaged through the aligned holes in the metal blocks 132 and 134. The bar 146 is slidably engaged through the other set of aligned holes in the blocks 136 and 138. The bars 146 and 148 are firmly attached near each end to two identical Y-conveyors 150 and 152.

The Y-conveyor 150 is in essence a rectangular metallic block with its longest or transverse dimension equal or slightly greater than the width of the carriage 126. Means are provided for affixing the Y-conveyor 150 to the two parallel bars 146 and 148 so that the transverse dimension is exactly perpendicular to the bars 146 and 148. A hole is drilled through the Y-conveyor 150 along the transverse dimension so that the Y-conveyor 150 slides smoothly on a ½" diameter steel axle 154. In a similar fashion a second identical steel axle 156 is provided for the second Y-conveyor 152. The axles 154 and 156 are each fixed to the top of a working table 158 respectively by a pair of end supports 159 and 160 secured at either end of the axles 154 and 156. The axles 154 and 156 are positioned so that when the Y-conveyors 150 and 152 slide along the axles 154 and 156 the carriage 126 moves parallel to the top of the working table 158 and to the two axles 154 and 156.

The X-stepper motor 115 is fixed in a corner of the upper surface of the working table 158 with its axis parallel to the axle 154 and so that axle 154 is between the axis of the X-stepper motor 115 and the carriage 126. The X-stepper motor 115 drives a square shaft 161 of suitable length which is 36" in the present embodiment.

The end of the square shaft 161 opposite to the X-stepper motor 115 fits into a support 162. The support 162 is equipped with appropriate bearings (not shown) so that the square shaft 162 turns freely when driven by the X-stepper motor 115.

A gear 164 is mounted on the square shaft 161 so that the gear 164 is free to slide along the length of the square shaft 161. This gear 164 is mounted so that it rotates with the square shaft 161.

A second shaft 166 is rigidly mounted by a pair of supports 168 on the top of the Y-conveyor 152 whereby the shaft 166 moves in joint motion with the Y-conveyor 152 and at the same height and parallel to the square shaft 161. A second gear 170 is rotatably mounted near one end of the shaft 166. The two gears 164 and 170 have identical outer diameters, tooth shape, and spacing.

One end of a flexible drive chain 174 is passed over the top and looped back underneath the gear 164, and is firmly affixed by screw 175 to the carriage 126. The second end of the drive chain 174 passes over the gear 170 and is pulled tight so as to cause the gears 164 and 170 to rotate simultaneously. The other end of the drive chain 174 is looped back under the gear 170 and firmly affixed to the carriage 126 by screw 176 so that rotation of the X-stepper motor 115 causes the carriage 126 to move along the steel bars 146 and 148. In this way rotation of the X-stepper motor 115 moves the carriage 126, and the plastic sheet 122 clamped to the carriage 126 along the x-axis. The drive chain 174 is a Min-E-Pitch-Chain Drive commercially available from Winfred E. Berg. Inc., East Rockaway, Long Island, N.Y.

The Y-stepper motor 116 is mounted at a corner of the top of the working table 158 next to the second Y-conveyor 152. The Y-stepper motor 116 is oriented so that its axis is orthogonal to that of the X-stepper motor 115. A freely rotating axle 177 with a gear 178 attached is mounted by support 179 with its axis parallel with that of Y-stepper motor 116. The axle 177 is mounted across the working table 158 from the Y-stepper motor 116 at the end of the axle 156. The gear 178 is mounted to lie in the same plane as a gear 180 which is mounted on a drive shaft 182 of the Y-stepper motor 116. The imaginary plane passing through the two gears 178 and 180 also passes through the second Y-conveyor 152.

A second drive chain 184 is passed over and around the two gears 178 and 180. The ends of the drive chain 184 are firmly attached to screws 185 to the second Y-conveyor 152 so that any rotation of the Y-stepper motor 116 moves the Y-conveyors 150 and 152 along the axles 154 and 156.

As the Y-conveyors 150 and 152 move along the axles 154 and 156 the carriage 126 is caused to move in the same direction as the Y-conveyors 150 and 152 because of the rigid coupling provided by the bars 146 and 148. In this way rotation of the Y-stepper motor moves the carriage 126 and the plastic sheet 122 secured to the carriage 126 along the y-axis.

As the carriage 126 moves with the Y-conveyors 150 and 152 the carriage 126 moves the lower end of the drive chain 174 causing the gear 164 to slide along the square shaft 161, thereby causing the entire drive chain 174 to move with the carriage 126.

The described embodiment of the positioning means 124 decouples the weight of the X-stepper motor 115 and the Y-stepper motor 116 from the carriage 126 and thereby greatly increases the speed of operation of the machine tool 120.

Referring to FIGS. 4, 5, 6 and 7 a drill positioning means 186 is shown for positioning and driving a drill 118 under the direction of the computer 108. The drill-positioning means 186 along with the drill 118 are contained in a box-like structure 190 having a flat bottom surface 192 which is maintained parallel to and a fixed distance from the working table 158 by four side panels 194. As can best be seen in FIG. 2 a rectangular hole 196 in the working surface 158 allows the drill 118 access to the plastic sheet 122.

The drill 118 comprises the tapered drill bit 127 which is used to drill the plurality of holes into the plastic sheet 122 and which is mounted in a drill chuck 200. The drill bit 127 is driven through a flexible shaft 202 by a separate motor 204 which itself is rigidly fixed to the bottom surface 192.

Referring to FIGS. 4, 5, 6 and 7 drill positioning means 186 comprises a slide 205. The drill chuck 200 is secured to the slide 205 by a clamp 206 so that the drill bit 127 is pointed upward and projects beyond the top of the slide 205. The slide 205 is slidably mounted by ball bearings (not shown) on an L-shaped bracket 208 for vertical motion only. A lower portion 210 of the L-shaped bracket 208 is secured to the bottom surface 192 by screws 212 so that an upper portion 214 of the L-shaped bracket 208, upon which the slide 205 is mounted, extends up vertical to the bottom surface 192.

A rack 216 is vertically secured along the center of the lower length of the slide 205 opposite the L-shaped bracket 208. A pinion 218 which is mounted on a shaft 220 of the Z-stepper motor 117 is drivenly engaged with the rack 216. The Z-stepper motor 117 is securely mounted on the outer face of a middle section of a C-shaped bracket 222. The shaft 220 of the Z-stepper motor 117 extends through a hole in the C-shaped bracket 222 and is parallel to the bottom surface 192. A lower portion 224 of the C-shaped bracket 222 is secured to the bottom surface 192 by screws 226.

A J-shaped guide 230 is provided for keeping the slide 205 engaged to the L-shaped bracket 208 over the entire travel of the slide 204. The J-shaped guide 230 is secured to another L-shaped bracket 232 by screws 234, which is in turn secured to the top face of the C-shaped bracket 222 by screws 236.

The vertical height of travel of the drill bit 127 is controlled through the drill positioning means 186 by angular motion from the Z-stepper motor 117. When the Z-stepper motor 117 turns through an angle upon signal from the computer 108 the drill positioning means 186 vertically positions the rotating drill bit 127 so that it can penetrate a desired distance into the plastic sheet 122. The penetration depth is proportional to the angular rotation of the Z-stepper motor 117.

At the start of operation of the device of the present invention the drill bit 127 is located in the corner position of the 120×126 array of positions closest to the reference corner 142 of the plastic sheet 122. The computer 108 reads the 6-bit digital signal representative of that location in the array of memory locations and outputs a signal to the Z-stepper motor 117 through the Z-translator 114 which drives the drill bit 127 via the drill positioning means 186 a discrete number of steps up into the plastic sheet 122 corresponding to the value of the 6- bit digital signal. Since the drill bit 127 is tapered, the deeper the cut into the plastic sheet 122, the lighter that portion of the image appears.

After the hole is drilled to the appropriate depth the drill bit 127 is lowered back down out of the plastic sheet 122. The computer 108 then reads the 6- bit digital signal in the next memory location in the same row of the array of memory location in the memory of the computer 108. As the computer accesses this next memory location a signal is outputted to the X-stepper motor 115 through the X-translator 112 causing the plastic sheet 122 to be indexed one position along the x-axis by the positioning means 124. The drill bit 127 is driven up into the plastic sheet 122 at this next position to drill a hole in the plastic sheet 122 proportional of the 6-bit digital signal stored in that position of the array of memory locations.

This operation is repeated for all 120 memory locations in the same row. When the last position is reached in that row the computer 108 outputs a signal to the Y-stepper motor 116 through the Y-translator 113 causing the plastic sheet 122 to be indexed one position along the y-axis by the positioning means 124. The operation of accessing the memory locations and drilling the holes is repeated in the opposite direction for the second row, and this pattern continues until the plastic sheet 122 has been systematically indexed through the entire 120×126 array of positions.

Figure 10:
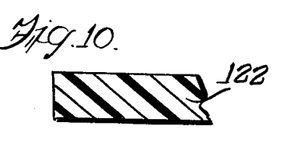
FIG. 10 is a broken away sectional view taken generally along lines 10—10 in FIG. 9.
Figure 11:
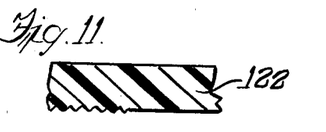
FIG. 11 is a broken away sectional view taken generally along lines 11—11 in FIG. 9.
Figure 12:
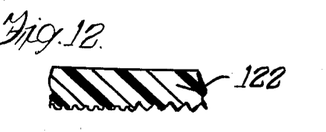
FIG. 12 is a broken away sectional view taken generally along lines 12—12 in FIG. 9.

Referring to FIGS. 9 through 12 there is shown the plastic sheet 122 with a representation of the subject image 100 drilled into the plastic sheet 122. FIG. 10 shows an area corresponding to a dark area of the subject image 100 and therefore no holes are drilled into the plastic sheet 122. FIG. 11 shows an area corresponding to both a light area and a dark area of the subject image 100 and therefore holes are only drilled in a portion of the plastic sheet 122. FIG. 12 shows an area corresponding to different shades of lightness of the subject image 100 and therefore the holes are drilled in varying depth in the plastic sheet 122. In FIG. 12 the lighter portion can been seen to have deeper holes, and thereby these holes will have larger diameters then the holes of the darker areas.

The disclosed embodiment is programmed to position the drill bit 127 a possible eight steps into the plastic sheet 122 with each step being about 0.001–0.004 inches and the maximum diameter of each hole being about one-sixteenth inches. Although the computer 108 can be programmed to drill 64 discrete steps utilizing the entire 64 possible values of each 6 bit digital signal, it has been determined that having 8 or 16 steps into the plastic sheet 122 gives adequate resolution for a 120×126 array of positions located over an approximate area of 1⅛" by 1⅛" of the plastic sheet 122. The number of steps is a function of the program and the 64 level light scale can be multiplied or divided to actually step the motors. By reducing the number of discrete steps the speed of operation increases. It is noted that with these dimensions some overlapping of holes can occur.

It is also noted that to increase the 3-dimensional effect of the image drilled into the plastic sheet 122 the depth and number of steps can be increased accordingly. Also, to increase the size of the drilled image in the disclosed embodiment the computer can be programmed to index one or more spaces between drilling positions on the plastic sheet 122.

In accordance with further aspects of the device of the present invention many variations of the disclosed embodiment are possible. The computer can be programmed to allow an operator, through the operator terminal, to enhance, reverse, lighten or darken the image. Working media other than clear plastic may be used, such as colored or mirror plastic surfaces. A triple axis table utilizing a turntable could be used to engrave or cut into curved surfaces. Other cutting devices can be used such as a laser. The video camera can be replaced by an input from, for example, a video-tape recorder or an axial tomograph. Finally the device of the present invention has obvious applications in industrial processes. For example patterns for engraving can be placed in the computer's memory by various methods to produce writings, designs, or pictures.

From the foregoing, it should be appreciated that a novel computer controlled reproduction device has been described for recreating a 3-dimensional image in a permanent medium such as a sheet of transparent plastic. The device can be readily adjusted to create various degrees of 3-dimensional images in the plastic sheet by varying the number of steps cut into the plastic sheet, and by varying the depth of each cut. Further the unique drive system for positioning the plastic sheet over the drill bit and propelling the drill bit up into the plastic sheet increase the speed with which an image can be generated thereby making the device practical and economical to use. This is achieved by eliminating as much weight as possible from the carriage within which the plastic sheet is clamped, and the slide which is used to propel the drill bit up into the plastic sheet. To this end a flexible drive shaft is used to couple the drill motor from the drill bit, and the carriage is coupled to its drive motors by a unique drive mechanism including two drive chains which isolate the carriage from its drive motors.

It should be understood that although certain preferred embodiments of the present invention have been illustrated and described, various modifications, alterations and equivalents thereof will become apparent to those skilled in the art and, accordingly, the scope of the present invention should be defined only by the appended claims and equivalents thereof.

Various features of the invention are set forth in the following claims.

What is claimed is:

1. A device for engraving a subject image into a sheet comprising:
   generating means for generating an array of digital signals representative of the subject image, each of said digital signals having a value representative of the intensity of a point of the subject image and having a position in the array representative of the planar position of the respective point in the subject image;
   a computer having memory means with an array of storage positions for storing the array of digital signals, the computer being operatively coupled to the generating means for receiving and transferring the array of digital signals to the memory means, the computer having sampling means for sequentially sampling the array of digital signals stored in the memory means and generating a first signal representative of the planar positions of the digital signal in the array which is being sampled, and a second signal representative of the intensity of the digital signal in the array which is being sampled,
   securing means for securing a surface of the sheet to a reference position;
   scribing means for scribing a plurality of holes into the surface of the sheet;
   positioning means operatively coupled to the computer for receiving the first signal therefrom, and responsive to the first signal for adjusting the relative position of the scribing means along the surface of the sheet a specific position from the reference position representative of the planar position of the digital signal being sampled in the array; and
   control means operatively coupled to the computer for receiving the second signal therefrom, and operatively coupled to the scribing means for controlling under the direction of the computer the surface area of each of the plurality of holes scribed into the surface of the sheet with the scribing means, the surface area of each of the plurality of holes corresponding to the respective intensity of each of the digital signals stored in each of the memory positions in the array whereby the plurality of holes creates an image in the sheet representative of the subject image.

2. The device of claim 1 wherein the positioning means under the direction of the computer sequentially positions the surface of the sheet over the scribing means in an array of positions corresponding to the array of storage positions of the memory means.

3. The device of claim 2 wherein the scribing means comprises a cutting tool having a tapered cutting tip.

4. The device of claim 3 wherein the control means control the surface area of each of the plurality of holes by positioning the tapered cutting tip of the cutting tool a measured distance into the sheet.

5. The device of claim 4 wherein the cutting tool further comprises:
a drive motor;
a chuck within which the cutting tool is secured; and
means for rotatably coupling the drive motor to the chuck.

6. The device of claim 4 wherein control means are secured to the chuck for positioning the cutting tip of the cutting tool into the surface of the sheet.

7. The device of claim 6 wherein the control means comprise:
a positioning motor operatively coupled to receive the second signal from the computer to control the positioning of the cutting tool;
a first slide, the chuck secured to the first slide; and
third coupling means for coupling a drive of the positioning motor to the first slide whereby actuation of the positioning motor under control of the computer positions the chuck and therby the cutting tip of the cutting tool along the slide and into the plastic sheet.

8. The device of claim 7 wherein the positioning motor is a stepper motor whereby the control means under the direction of the computer positions the cutting tip into the sheet in discrete steps.

9. The device of claim 1 wherein the generating means comprise:
a video camera having an analogue output signal representative of the subject image; and
an analogue-to-digital converter for converting the analogue output of the video camera into the array of digital signals representative of the subject image.

10. The device of claim 9 further comprising a first viewing monitor for monitoring the subject image as represented by the analogue output of the video camera.

11. The device of claim 9 further comprising a second viewing monitor for monitoring the subject image as represented by the array of digital signals stored in the memory means.

12. The device of claim 2 wherein the first signal comprises a horizontal signal and a vertical signal, and wherein the positioning means comprises:
first and second sliding means engaged to the securing means for allowing respectively horizontal and vertical motion of the securing means in a plane situated above the scribing means;
horizontal positioning means operatively connected to the computer for receiving the horizontal signal, and drivingly engaged to the securing means for horizontally positioning the securing means and thereby the sheet along the plane responsive to the horizontal signal; and
vertical positioning means operatively connected to the computer for receiving the vertical signal, and drivingly engaged to the securing means for vertically positioning the securing means and thereby the sheet along the plane responsive to the vertical signal.

13. The device of claim 12 wherein the horizontal positioning means comprise a horizontal motor operatively connected to receive the horizontal signal from the computer, and first coupling means drivingly engaging the horizontal to the securing means; and the vertical positioning means comprising a vertical motor operatively connected to receive the vertical signal from the computer, and second coupling means drivingly engaging the horizontal motor to the securing means.

14. The device of claim 13 wherein the first coupling means comprises a first belt for drivingly engaging the horizontal motor to the securing means, and the second coupling means comprises a second belt for drivingly engaging the vertical motor to the securing means.

15. The device of claim 14 wherein the horizontal and vertical motors are stepper motors whereby the positioning means under the direction of the computer position the sheet over the scribing means in an array of discrete steps.

* * * * *

UNITED STATES PATENT AND TRADEMARK OFFICE
CERTIFICATE OF CORRECTION

PATENT NO. : 4,385,360
DATED : May 24, 1983
INVENTOR(S) : Mitsuru Yamada et al.

It is certified that error appears in the above-identified patent and that said Letters Patent is hereby corrected as shown below:

Column 2, line 29, "y-" should read --y- --;

Column 2, line 60, "panasonic" should read --Panasonic--

Column 5, line 23, after "Berg" replace the period with a comma;

Column 5, line 40, "to" should read --by--;

Column 8, line 51, "positions" should read --position--.

Signed and Sealed this

Eighteenth Day of October 1983

[SEAL]

Attest:

GERALD J. MOSSINGHOFF

Attesting Officer     Commissioner of Patents and Trademarks